Dec. 17, 1963    D. KAYSER ETAL    3,114,893
DEVICE FOR MARKING WITH LIGHT A HIGH VOLTAGE OVERHEAD LINE
Filed Feb. 26, 1959    2 Sheets-Sheet 1

INVENTORS
DANIEL KAYSER
JEAN LAULIAC
BY Irvin S. Thompson
ATTY.

INVENTORS
DANIEL KAYSER
JEAN LAULIAC
BY *Irvin S. Thompson*
ATTY.

United States Patent Office 3,114,893
Patented Dec. 17, 1963

3,114,893
DEVICE FOR MARKING WITH LIGHT A HIGH VOLTAGE OVERHEAD LINE
Daniel Kayser, Paris, and Jean Lauliac, Viroflay, France, assignors to Claude Paz et Visseaux, Paris, France
Filed Feb. 26, 1959, Ser. No. 795,744
Claims priority, application France Mar. 19, 1958
9 Claims. (Cl. 340—28)

The present invention relates to a device for marking with a high voltage alternating current overhead line, such device being of the kind wherein electrical energy is picked up by means of an auxiliary conductor disposed in the vicinity of one of the cables carrying the electric power, and an indicator or marker light is produced by a gaseous electric discharge tube which uses the potential differences existing between the auxiliary conductor, the cables of the line and earth.

Devices of this kind, described for example in the U.S. Patent No. 2,177,858 granted on October 31, 1939, are used in order to indicate to aircraft the presence of high voltage lines. They offer the advantage that they may be supported and energized simply by one of the line cables. This allows them to be suspended from any point along the cable, and not only at the towers which support the high voltage line.

With devices of the kind indicated it is necessary, in order that the discharge tube shall emit enough light, to ensure that the auxiliary conductor be of sufficient length. Every other consideration being equal, the length of the auxiliary conductor increases when the voltage of the line to be marked is decreased. But an increase in length necessitates an increase in the number of insulators required for suspending the auxiliary conductor from the power cable, which in turn increases the power losses due to the surface conduction on such insulators.

In practice, these known devices are not efficient enough when the potential difference between the line and earth is lower than 60,000 volts.

The device of the invention is characterized in that the whole, or part, of the electrical energy picked up by means of the auxiliary conductor is stored, after being rectified, in a condenser which is adapted to discharge into the tube when its voltage reaches the starting voltage of the tube.

The intermittent operation produced by such a device makes it possible to obtain a luminous energy which will be sufficient even when the power of the current source formed by the auxiliary conductor is weak. Moreover it makes use of certain distinctive features of intermittently operating or blinking lamps, which are that they are much more readily noticed than continuously operating lamps having the same instantaneous power and that they are easily distinguished from luminous points which surround them and which emit light continuously.

It may happen, with the device above described comprising a condenser loaded up by a rectifier, that the discharge tube, after having emitted a flash not long after switching on, will function at too long intervals. This is due to the fact that in the auxiliary conductor, which supplies the condenser with a current having a constant direction, an electrical charge tends to build up. This drawback may be obviated by connecting a convenient element between the auxiliary conductor and the neighboring cable which element will dissipate this charge.

In the case where the rectifier at least is disposed within a metal casing, it is often convenient to connect the latter to the positive terminal of the rectifier by a direct current conducting connection.

It has been found that dust has a very substantially lesser tendency to form deposits on the insulators affixed to the casing when the latter is thus brought to a positive potential than when said casing is connected to the line or to the auxiliary conductor or to a negative potential. This effect is specially marked in the case of the insulator associated with the wire which feeds the negative electrode of the luminous tube. The current losses due to this dust, which losses lessen the electric energy which is available for energizing the luminous tube, are thus partially avoided.

This invention will be better understood from the following description of six embodiments taken in conjunction with the accompanying drawings, in which.

Figure 1:
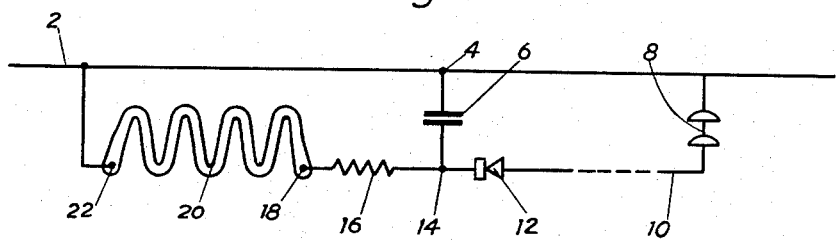
FIGURE 1 shows a simple device.

Referring now to FIGURE 1, 2 denotes one of the cables of a high voltage overhead electric line, for example a three phase line with 60,000 volts between the phases, which makes about 35,000 volts between each phase and earth. An auxiliary conductor 10 is suspended from the cable 2 by means of an insulator 8 and by a fitting which incorporates a discharge tube 20.

When the discharge tube 20 has an inner diameter of 7 to 8 mm., a length of 1.5 to 2 meters between its electrodes 18 and 22 and an atmosphere of neon gas with a pressure of several mm. of mercury, the auxiliary conductor may have the following features:

Diameter: 20 to 40 mm.,
Length: 8 to 16 m., in 4 m. lengths between insulators,
Distance from the neighboring cable, that is the cable 2: 0.15 to 0.30 m.

The tube 20 may be wound into a helix or folded as a snake in order to decrease the room it occupies. Its starting voltage is about 8 to 10 kv.

A condenser 6, of several tenths of a microfarad and insulated for 10,000 volts, shunts tube 20

A rectifier 12 allows the condenser 6 to be charged by the alternating current electrical energy supplied by conductor 10. When the voltage at the terminals of condenser 6 reaches the starting voltage of tube 20, the electric discharge starts in the latter and terminates when the voltage at the condenser terminals becomes lower than the extinguishing voltage of the tube. The electric current which flows through the tube 20 between starting and extinguishing is supplied by the charge stored in condenser 6 and practically not by conductor 10 since the discharge is very brief.

It is advantageous that the extinguishing voltage of tube 20 be low in order to utilize to the maximum the capacity of condenser 6.

It is also of advantage, when the tube is filled up with neon gas, that each discharge in tube 20 should not be too brief since the human eye is not very sensitive to very brief light flashes.

In order to lengthen the discharge duration, it is sufficient serially to connect with the condenser 6 and the tube 20 a resistor 16 or several resistors. This resistor may be inserted between the condenser 6 and that point 4 of the cable to which the condenser is connected, or between the condenser and the point 14 at which the latter is connected to the rectifier. A self-inductance coil may take the place of the whole or of a portion of the resistor.

It is also possible, as will be seen from FIGURE 1, to connect the electrode 18, which is fed by rectifier 12, through resistor 16 to the common terminal of the condenser and of the rectifier. It is electrically equivalent, therefore it is also possible, to connect the cable 2 through the resistor to that electrode 22 which is connected to said cable.

It is also possible to place resistors in several positions.

In the case for which numeral values have been given above, the resistance value of resistor 16 or of the resistors which take its place will be of the order of 100,000 ohms.

The rectifier 12 is so designed as to be capable of stopping without undue strain a voltage a little higher than the starting voltage of tube 20. The operating times of tube 20 are independent of those of the tubes incorporated in any neighboring device which may be present.

Figure 2:
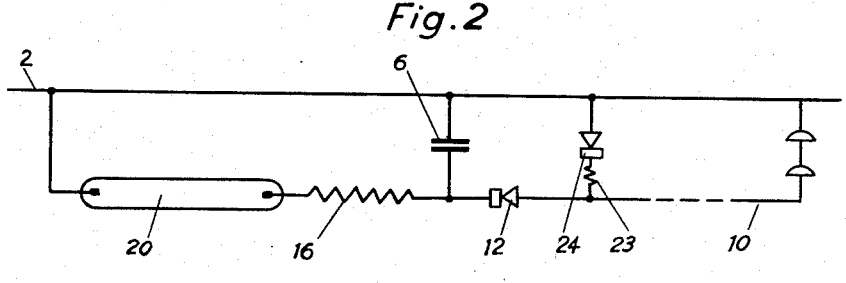
FIGURE 2 shows an alternative embodiment of the device of FIGURE 1 incorporating an element for discharging the auxiliary conductor.

FIGURE 2 represents a device which differs from that above described only by reason of the addition of an element used for discharging from auxiliary conductor 10 the electric charges it accumulates, which charges the rectifier 12 prevents from being transmitted to the condenser 6. In the embodiment shown in FIGURE 2, this element comprises a rectifier 24 connected in such a direction that it is traversed by the current from conductor 10 during that half cycle during which the current cannot traverse the rectifier 12. A resistor 23 may be serially connected with rectifier 24 in order to decrease the reverse current in the latter when the reverse resistance of the rectifier is too weak.

The rectifier 24 is designed for the same current intensity and voltage as the rectifier 12. These rectifiers may be of various kinds: semi-conductors, gas valves, etc.

Figure 2A:
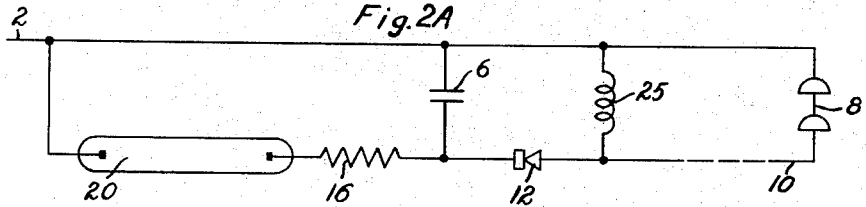
FIGURE 2A shows the embodiment of FIGURE 2 with an alternate element for discharging the auxiliary conductor.

It desired, the rectifier 24 may be replaced by other means such, for example, as: a self-inductance coil such as coil 25 connected as shown in FIGURE 2A, a coil forming the primary winding of a transformer, or a resistor.

Figure 3:
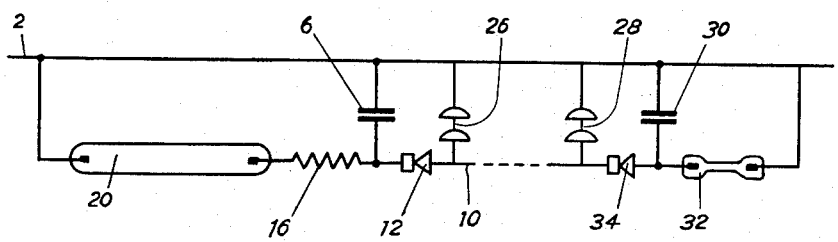
FIGURE 3 shows a device with two discharge tubes.

In FIGURES 2 and 2A the tube 20 is shown as a simple straight tube as is also the case with FIGURE 3, but clearly the tube of the kind such as illustrated in FIGURE 1 may equally well be employed.

FIGURE 3 shows a device in which the voltage of the conductor 10, when its direction does not allow it to charge the condenser 6, is used for energizing a second discharge tube. This other tube may be of another kind than a neon tube; it will comprise for example a xenon lamp 32 having 1 kg.:cm.$^2$ absolute pressure or a lamp filled with krypton or with an argon, krypton, xenon mixture.

The auxiliary conductor 10 is shown as being supported by two insulators 26, 28. The insulators 26, 28 may be omitted in cases when the tubes 20, 32 are protected by casings formed in such a manner that they are capable of playing the part of said insulators. If the conductor 10 is too pliable for end supports to be sufficient, one or more additional insulators may be added which will provide support at one or more interjacent points.

The added rectifier 34 feeds a condenser 30 with the voltage supplied by conductor 10 during every other half cycle, that is that half cycle during which the voltage does not charge condenser 6. When the voltage at the terminals of the condenser 30 reaches the starting voltage of the tube 32, said tube will start and thereby discharge the condenser 30. This discharge is short because it is not braked by any effective impedance such as is provided by the resistor 16.

The tube 20 is energized by a circuit including a resistor 16, a condenser 6 and a rectifier 12 similar to that described with reference to FIGURE 1.

The device of FIGURE 3 allows the emission at short intervals of luminous flashes which may offer different frequencies and colors. For instance, in the embodiment described the tube 20 will emit red light and tube 32 white light.

Figure 4:
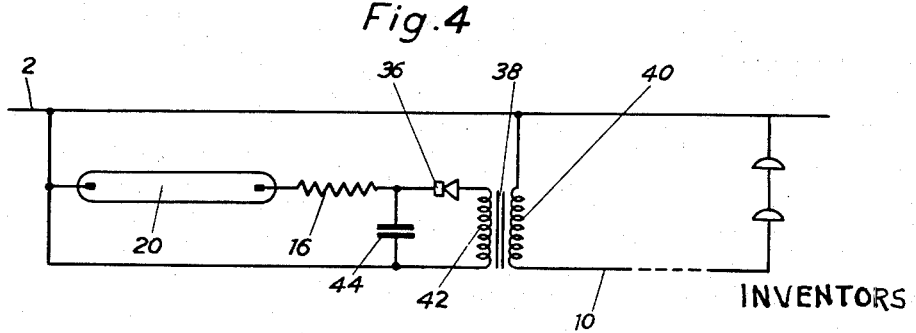
FIGURE 4 shows another alternative embodiment of the device of FIGURE 1, which embodiment incorporates a transformer.

FIGURE 4 shows a device in which the primary winding 40 of a transformer 38 connects cable 2 to the adjacent auxiliary conductor 10.

The transformation ratio of this transformer depends, among other things, on the maximum voltage between the cable 2 and the conductor 10 and on the starting voltage of the tube 20.

The secondary winding 42 of this transformer feeds a condenser 44 through a rectifier 36. The condenser is discharged by the tube 20 through resistor 16 when the voltage at its terminals is sufficient, as has been described in connection with FIGURE 1.

The conductor 10 cannot accumulate those electric charges which the rectifier 36 prevents from flowing, such charges being dissipated through the winding 40.

The device of FIGURE 4 is a little more intricate than that shown in FIGURE 1 and costs more than that shown in FIGURE 2. However it offers the advantage that it allows the starting voltage of tube 20 to be set at any value, independently of the voltage which the conductor 10 may take relatively to cable 2.

If desired, an autotransformer may be used in the place of a double wound transformer such as is indicated at 38.

Figure 5:
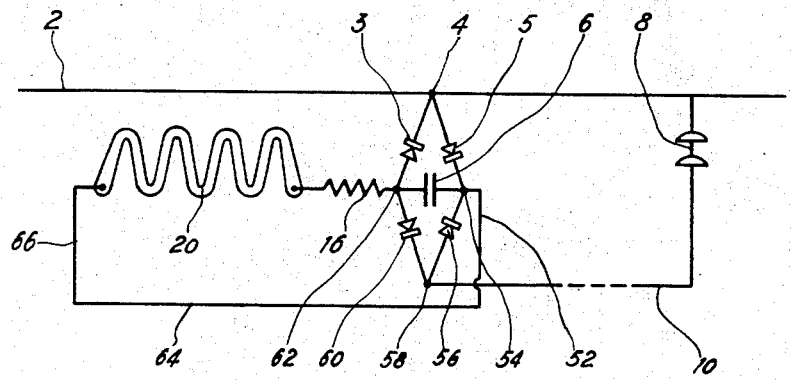
FIGURE 5 shows a further alternative embodiment, which embodiment differs from the device of FIGURE 1 by reason of the type of rectifier employed.

FIGURE 5 shows diagrammatically a device which differs from the one of FIGURE 1 only by reason of the type of rectifier employed.

To one of the cables 2, of a high voltage line, are attached an auxiliary conductor 10, a discharge lamp 20, for example a neon tube coiled in the form of a helix, and the equipment which energizes lamp 20 from energy picked up by conductor 10.

This equipment comprises four rectifiers 3, 5, 56, 60 which are bridge connected in the known manner and a condenser 6. Two opposite connections 4 and 58 of the bridge are respectively connected to the cable 2 and the conductor 10. The other connections 54 and 62 are connected to the condenser 6 which shunts the assembly comprising lamp 20 and a resistor 16 which are serially connected with each other. In place of the resistor 16, the function of which is to make each discharge longer, a self-inductance coil may be substituted. The latter wastes less electrical energy and, when it is conveniently chosen, it will cause the condenser 6 to discharge thoroughly, which makes the blinking rhythm more regular.

Insulators such as that indicated at 8 serve to support the auxiliary conductor, the lamp and the equipment therefor.

The alternating potential difference appearing between cable 2 and conductor 10 is rectified by rectifiers 3, 5, 56, 60 and charges the condenser 6. When the voltage of the latter reaches the starting voltage of lamp 20, the electric discharge will start in the latter and the condenser will be more or less thoroughly discharged before the lamp is extinguished. The condenser 6 is then charged anew with the electric current rectified by rectifiers 3, 5, 56, 60, and the process begins again.

The bridge connected rectifiers 3, 5, 56, 60 is more costly than the plain rectifier incorporated in the device shown in FIGURE 1, but it charges the condenser 6 with both half-cycles of the voltage existing between cable 2 and conductor 10. This allows, the power consumed in lamp 20 being assumed to be equal, the size of the auxiliary conductor 10 to be decreased. If the latter is not changed, a stronger luminous intensity is obtained.

Another advantage of the embodiment of FIGURE 5 is that, since use is made of both half cycles for charging the condenser, the auxiliary conductor does not tend to charge up progressively. In such circumstances, it is not necessary to provide an element intended for draining off this charge.

Figure 6:
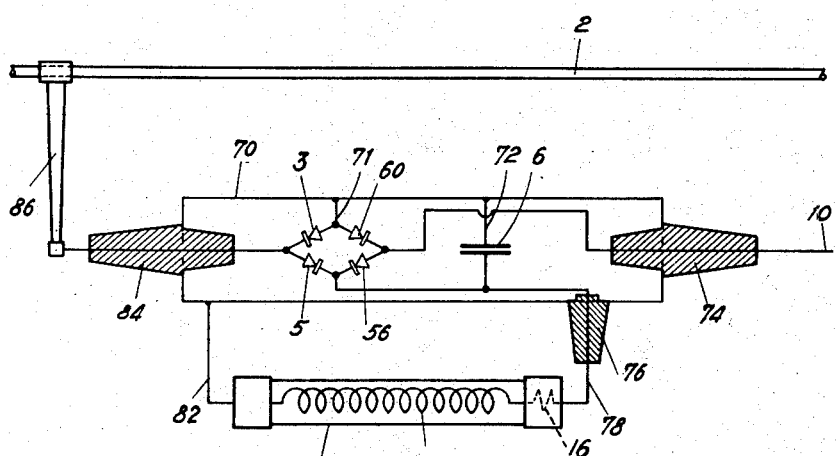
FIGURE 6 shows an alternative embodiment of the device of FIGURE 5.

FIGURE 6 shows an embodiment of the invention arranged so as to decrease the current leaks due to dust forming a deposit on the insulators. The rectifier which charges the condenser is of the bridge type as shown in FIGURE 5, but the arrangement shown in FIGURE 6 would also be suitable in the case where another type of rectifier is employed, for example a rectifier with one cell only.

In FIGURE 6, a metal casing 70 contains the apparatus for energizing a discharge tube 20. This apparatus comprises, for example, a rectifier with bridge connected cells 3, 5, 56, 60 and a condenser 6, so as to make the tube 20 blink in the manner above explained.

The items indicated above are electrically connected, on the one hand to a cable 2 which carries the electric power, on the other hand to an auxiliary conductor 10, disposed for example several decimeters below the cable 2 and mechanically attached to the latter by insulators (not shown). The connecting wires pass through the casing wall axially of insulators 74 and 84.

The casing 70 is supported by a metal rod 86 which electrically connects the apparatus to the cable 2, and also by the auxiliary conductor 10.

In this case, the helically coiled, discharge tube 20 is enclosed in a protecting sleeve 80 and its electrodes are respectively connected to the apparatus by a resistor 16 and a wire 78 which passes through the casing axially of an insulator 76, and by a wire 82 which is soldered to the casing. The circuit between wire 82 and the apparatus is made complete by the casing wall and by wires 71 and 72 which connect the latter respectively to the positive terminal of rectifiers 3, 5, 56, 60 and to condenser 6.

Numerous changes may be effected in the various devices above described. In particular these devices are applicable to very high voltage lines, for instance 220,000 and 380,000 volts lines. If a voltage between phases of 60,000 volts only has been cited as an example, the reason is that in such conditions the problem involved is more difficult to solve and even insoluble with devices employed hitherto.

What we claim is:

1. A device for marking a high voltage alternating current overhead line having a large potential difference between said overhead line and ground comprising insulators suspended from one cable of said overhead line, an auxiliary conductor disposed adjacent said one cable by said insulators so that the distance between said auxiliary conductor and said one cable is only a fraction of a meter, a gaseous electric discharge tube for producing light, a condenser permanently connected in parallel with said tube through a non-capacitive impedance means for connecting one end of said condenser to said one cable and means for connecting the other end of said condenser to said auxiliary conductor, at least one of said means comprising rectifier means connected serially with said condenser to charge said condenser with the potential difference between said one cable and said auxiliary conductor, said condenser discharging into said tube through said impedance when its voltage reaches the starting voltage of said tube to illuminate said tube.

2. A device for marking a high voltage alternating current overhead line having a large potential difference between said overhead line and ground comprising insulators suspended from one cable of said overhead line, an auxiliary conductor disposed adjacent said one cable by said insulators so that the distance between said auxiliary conductor and said one cable is only a fraction of a meter, a discharge tube for producing a marking light, a condenser permanently connected in parallel with said tube through a non-capacitive impedance means for connecting one end of said condenser to said one cable and means for connecting the other end of said condenser to said auxiliary conductor, at least one of said means comprising a rectifier connected serially with said condenser to charge said condenser with the potential difference between said one cable and said auxiliary conductor, said condenser discharging into said tube through said impedance when its voltage reaches the starting voltage of said tube, and an electrical element having one end connected to said one cable and the other end connected to said auxiliary conductor to discharge from said auxiliary conductor the electric charges that the latter accumulates.

3. A device according to claim 2 in which said electrical element comprises a rectifier.

4. A device according to claim 2 in which said electrical element comprises a self-inductance coil.

5. A device according to claim 2 in which said electrical element comprises a transformer.

6. A device according to claim 2 in which said electrical element comprises an assembly including a second rectifier, a second condenser, and a further discharge tube.

7. A device according to claim 1 in which said rectifier means consists of a plurality of bridge connected rectifier members, and said condenser is connected across two legs of said bridge while the other two legs of said bridge are connected to said cable and said auxiliary conductor respectively.

8. A device according to claim 1 in which said rectifier means is disposed in a metal casing, said rectifier means having its positive output terminal connected to said casing.

9. A device for marking by a flashing light a high voltage alternating current overhead transmission line comprising at least one insulator suspended from one cable of said overhead line, an auxiliary conductor mounted adjacent said one cable in close proximity thereto by said at least one insulator, a condenser, means for connecting one end of said condenser to said one cable, means for connecting the other end of said condenser to said auxiliary conductor, at least one of said means comprising rectifier means connected in series with said condenser to charge said condenser with the potential difference between said one cable and said auxiliary conductor, and discharge circuit means for said condenser including a gaseous electric discharge tube and noncapacitive impedance means in series, said discharge circuit means being connected between said one cable and said other end of the condenser so that said condenser discharges through said tube when its voltage reaches the starting voltage of said tube, the latter producing said flashing light References Cited in the file of this patent

UNITED STATES PATENTS

| | | |
|---|---|---|
| Re. 22,123 | Edgerton | June 23, 1942 |
| 1,795,176 | Lloyd | Mar. 3, 1931 |
| 1,998,107 | Vrooman | Apr. 16, 1935 |
| 2,006,737 | Gessford | July 2, 1935 |
| 2,088,478 | Kovalsky | July 27, 1937 |
| 2,095,306 | Austin | Oct. 12, 1937 |
| 2,134,439 | Dorgelo | Oct. 25, 1938 |
| 2,177,858 | Bethenod | Oct. 31, 1939 |
| 2,440,679 | Fountain | May 4, 1948 |
| 2,853,655 | Harders | Sept. 23, 1958 |

FOREIGN PATENTS

| | | |
|---|---|---|
| 763,018 | Germany | Mar. 1, 1954 |